June 13, 1939.   L. M. POTTS   2,162,358
ORIENTATION INDICATING DEVICE
Filed Dec. 30, 1935   4 Sheets-Sheet 1
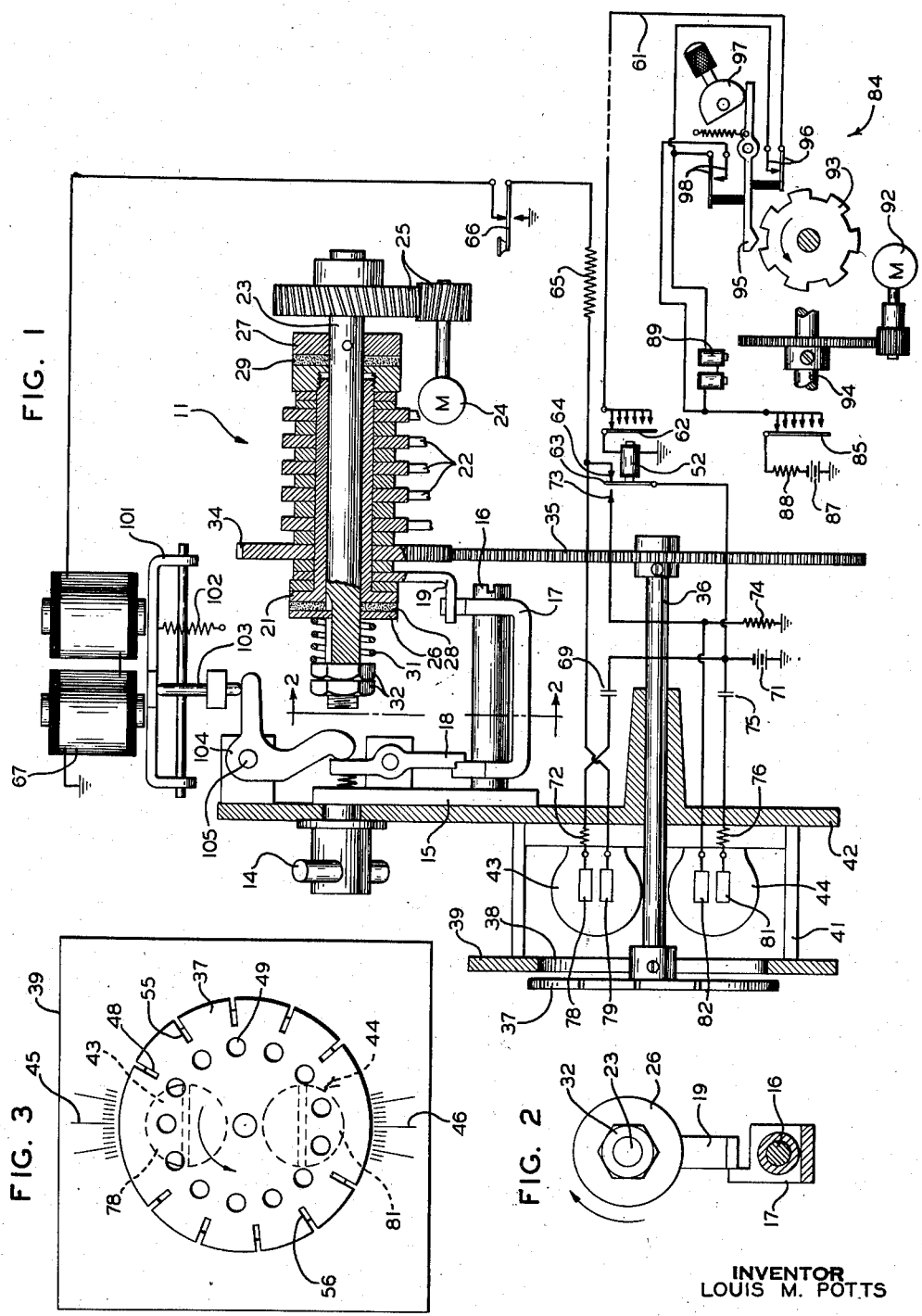
INVENTOR
LOUIS M. POTTS
BY
ATTORNEY June 13, 1939.  L. M. POTTS  2,162,358
ORIENTATION INDICATING DEVICE
Filed Dec. 30, 1935   4 Sheets-Sheet 2
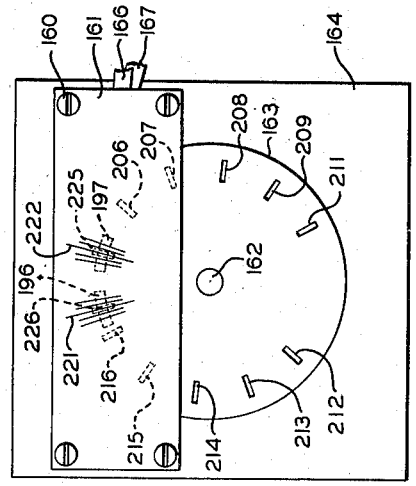
FIG. 6
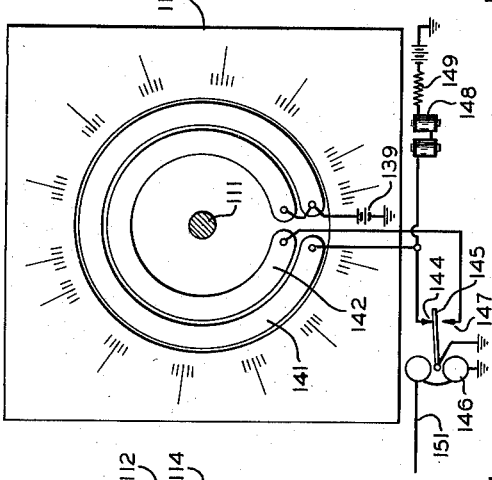
FIG. 5
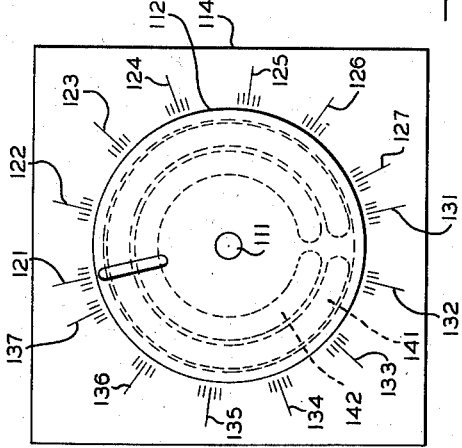
FIG. 4
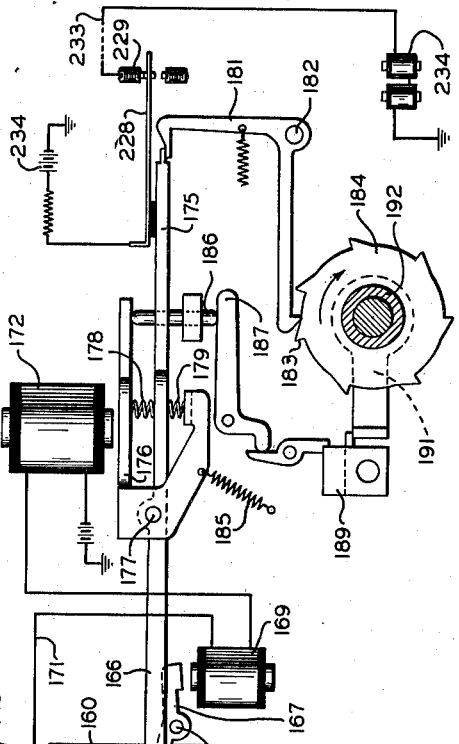
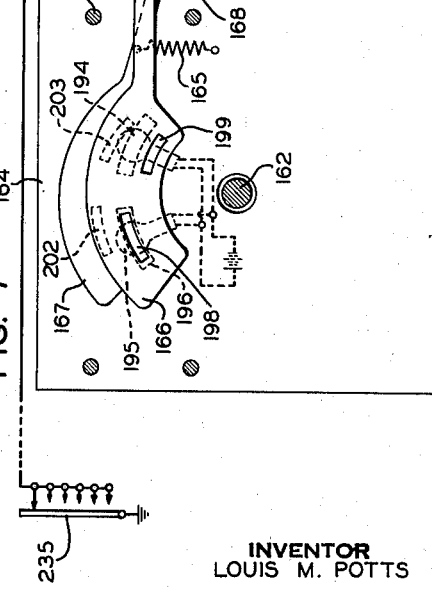
FIG. 7
INVENTOR
LOUIS M. POTTS
BY H.B. Whitfield
ATTORNEY June 13, 1939.                    L. M. POTTS                    2,162,358
                        ORIENTATION INDICATING DEVICE
                         Filed Dec. 30, 1935        4 Sheets-Sheet 3

INVENTOR
LOUIS M. POTTS
BY *J. B. Whitfield*
ATTORNEY

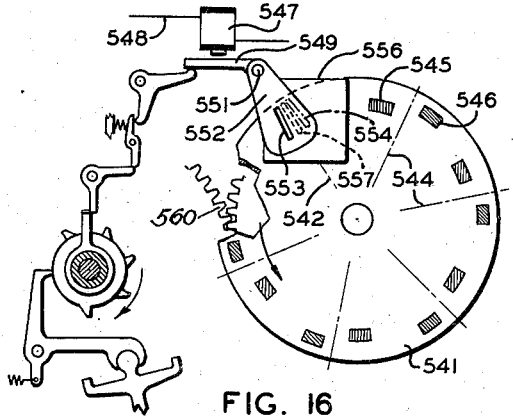
FIG. 16
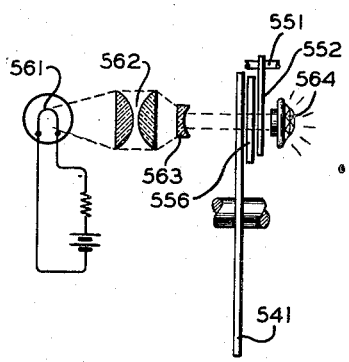
FIG. 17
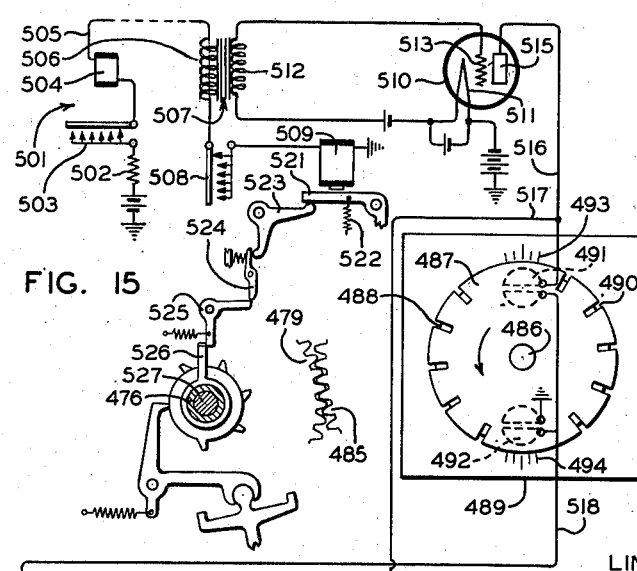
FIG. 15
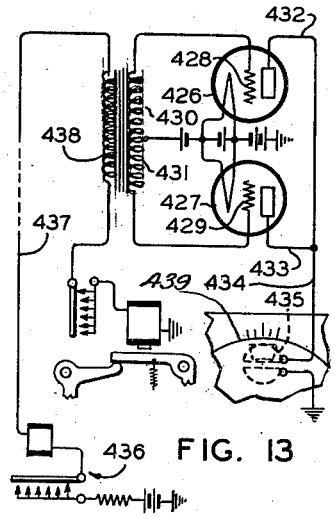
FIG. 13
FIG. 14
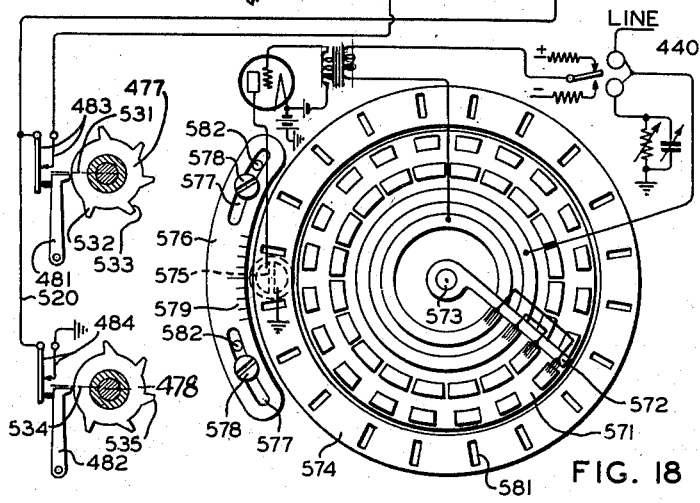
FIG. 18

Patented June 13, 1939

2,162,358

UNITED STATES PATENT OFFICE 2,162,358

ORIENTATION INDICATING DEVICE

Louis M. Potts, Evanston, Ill., assignor to Teletype Corporation, Chicago, Ill., a corporation of Delaware Application December 30, 1935, Serial No. 56,719

4 Claims. (Cl. 178—69)

This invention pertains to apparatus for the rapid and accurate propagation of intelligence by automatic telegraphic transmitting and receiving machines and specifically to apparatus for indicating continuously the condition of adjustment or maladjustment of such machines.

Modern telegraphic transmission comprises in one of its widely used forms a plurality of uniform series of electrical impulses each such series comprising elementary signals uniform in number and of equal time value, intelligence being transmitted by the expedient of reversing the polarity of some of the elementary signals or impulses or by omitting some of the elementary signals or impulses or by combinations of such methods. A series of impulses of equal length transmitted over a line conductor is received by a member whose period of operation is a multiple of the time of received elementary signal impulses so that the impulses severally occupy constant relative phase positions with reference to positions consecutively occupied by the periodic member.

Accordingly, it is the object of the present invention to make a visible manifestation of variations among received signals.

To achieve the object of invention, manifestations of the signals are produced simultaneously with the receipt of the elementary electrical impulses and are made evident in connection with a rotating member in manner such that the received impulses will produce an optical signal which appears stationary and whose location with reference to a fixed scale denotes the phasing or condition of angular adjustment and speed of the rotating element when referred to the timing of the signals as a reference. The rotating member of the indicator mechanism may be fixed to an operating printing telegraph machine and accordingly its indications may represent the degree of adjustment of the operating machine.

In the preferred form of the invention there is attached to a rotating part of a printing telegraph apparatus a slotted disc behind which is a lamp which flashes through a slot in the disc at the beginning of each elementary signal. With the flash of the lamp sufficiently brief, the illumination of the slot is so momentary that the slot appears motionless and appears adjacent to a fixed scale, the position of the flash with reference to the scale being an indication of proper adjustment or lack of adjustment in the operating telegraph apparatus. Cam controlled contacts may flash a lamp in a manner to indicate a condition of maladjustment. However, the lamp may be controlled not to be flashed when the orientation devices are properly adjusted with respect to each other.

Alternatively, the lamp may glow during each signal impulse of a predetermined nature, whereby the illumination through the slot may appear as a luminous arc adjacent to a scale, the positions and lengths of the several luminous arcs thus produced in each cycle of rotation of the slotted disc forming an indication of the adjustment of the telegraph apparatus. Also a continuously glowing lamp may be obscured by shutters whose operation in response to received signals will permit flashes of light upon a scale.

A better understanding of the invention may be had from the following description, taken in conjunction with the accompanying drawings, wherein Fig. 1 illustrates a sectional view of an orientation indicating device of preferred type, in conjunction with a start-stop selector;

Fig. 2 shows a mechanical detail of mechanism of Fig. 1 taken on line 2—2 of Fig. 1;

Fig. 3 illustrates a front elevational view of the rotating disc and the fixed graduated dial of Fig. 1;

Fig. 4 illustrates a modification of the structure shown in Fig. 1;

Fig. 5 shows a sectional view of apparatus of Fig. 4 with rotating disc removed and including its operating circuit;

Fig. 6 shows disc and dial assembly of an alternative structure embodying the invention;

Fig. 7 illustrates an assembly of operating parts of a regenerative start-stop repeater mechanism according to Fig. 6;

Fig. 13 illustrates a modification of the structure shown in Fig. 12, but using two lamps;

Fig. 14 illustrates a system for flashing one lamp at the beginning and at the end of every line signal current;

Fig. 15 illustrates a system for flashing a signal lamp under control of a thermionic valve and an induction coil under limiting conditions set up by cam controlled contacts;

Fig. 16 illustrates a mechanical shutter system associated with a distributor shaft and with an armature of a signal receiving magnet whereby no signal is produced when a telegraphic apparatus is accurate in phasing within a predetermined range, a signal of one color is produced by a lagging signal impulse, and a signal of another color is produced by an advanced signal impulse;

Fig. 17 illustrates an optical system for the structure shown in Fig. 16, and

Fig. 18 illustrates a modification of the invention adapted to a receiving mechanism of synchronous multiplex type.

Figure 9:
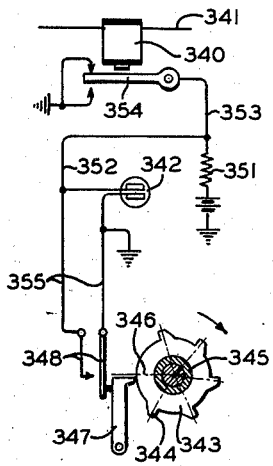
Fig. 9 illustrates a modification of the system shown in Fig. 8 with but a single lamp.

Referring to Figs. 1, 2, and 3, and particularly to receiving station 11, essential parts of a mechanical selector are illustrated of the type disclosed in U. S. Patent 1,783,382 to H. L. Krum in which orientation while operating is effected by turning a handle 14 fixed to an orientation plate 15 carrying screw stud 16, starting gate 17, and rocking lever 18 whereby relations between the angle of stop of arm 19 and its start-stop cam sleeve 21 in stop condition may be adjusted relative to selective cam followers 22. The start-stop cam sleeve 21 is supported upon shaft 23 driven continuously by a speed regulated motor 24 through gears 25, power from shaft 23 being imparted to sleeve 21 through a friction clutch comprising splined washer 26, fixed collar 27, friction rings, 28, 29, compression spring 31 and adjusting nuts 32. Fixed upon the start-stop cam sleeve 21 and revolving in start-stop manner with that sleeve is gear wheel 34 which meshes with a gear wheel 35 of double ratio so that a shutter shaft 36 and stroboscopic disc 37 are driven in start-stop manner in phase with cam sleeve 21 and at half speed. Disc 37 covers a circular opening 38 in a cover plate 39 of a lamp housing 41, fixed to a frame 42. Lamp housing 41 contains two signal lamps 43 and 44, while the cover 39 on its visible face bears graduations 45 and 46, Fig. 3, which are visible upon the housing near the edge of the disc 37. Since disc 37 revolves at half speed with reference to the selector start-stop cam sleeve 21, the disc is provided with two sets of radial stroboscopic slots 48, each set containing five slots or a slot for each unitary intelligence impulse of a start-stop code signal. Disc 37 is provided also with an annular series of synchronizing perforations 49 of any desired size, shape or number, thirteen being shown herein, although any suitable number will be required according to details of the system of preliminary synchronization which may be adopted. Slot 48 when the disc 37 is being held in its stop position is distant from a central mark of the graduation 45 by such an angle as will be traversed by the disc 37 after receipt of the disc-starting line impulse by line relay 52 and magnet 67 and up to the time of receipt of the first intelligence signal impulse by relay 52, so that should the first intelligence impulse be of marking nature a responsive flash of lamp 43 will occur when slot 48 is opposite the central mark of graduation 45, after which slots 55 and 56 are so positioned that with proper adjustment of the apparatus such slots will be opposite to middle marks of graduations 45 and 46 respectively when the second intelligence impulse is received from the line, and thereafter the remaining three slots on each half of disc 37 will reach graduations 45, 46 as the remaining three intelligence impulses are received, it being presumed in the figures and in this description that transmission is being effected with a five unit intelligence code, although any desired code of uniform length code signals may be used, and the structure modified accordingly.

In the operating circuit of Fig. 1 a line conductor or channel 61 for transmitted signals is connected through a transmitter 62 and the winding of a receiving line relay 52 whose armature 63 normally is in attracted position by reason of normal current of marking nature flowing in line channel 61. Front contact 64 of relay 52 is connected through resistance 65, manual key 66, and printer control magnets 67 to ground, and also is connected through lamp 43 and condenser 69 to battery 71, this circuit including also a resistance 72 mounted integrally with the lamp 43 in the base thereof and calibrated to permit flashing of the lamp 43 by current supplied from condenser 69 yet to prevent excessive current which might injure or destroy the lamp. Back contact 73 of relay 52 is connected through resistance 74 to ground and also through lamp 44 and condenser 75 to battery 71, this circuit including also an integral lamp-base resistance 76 for lamp 44 similar to resistance 72 and for the same purposes.

Lamps 43 and 44 have plate electrodes 78, 79, 81, 82, respectively, one of which in each lamp may be illuminated when current of sufficient intensity passes in one direction, and the other of which may be illuminated when current in like intensity passes in the other direction. In the structure of Fig. 1, only plates 78 and 81 are subject to illumination by virtue of a quick discharge through the lamps of condenser 69 or 75 respectively, current in reverse direction for recharging the condensers through the lamps being supplied at low intensity by virtue of resistances 65 and 74 included in the condenser charging circuits respectively and not in the condenser discharging circuits.

The lamps 43 and 44 are so placed within the lamp housing that the illuminable plates 79 and 81 in both lamps are adjacent to the path of slots 48 when disc 37 is rotating. Battery 71 is connected from armature 63 to ground and is suitable in polarity and potential for operation of lamps 43 and 44.

Connected to the transmission channel 61 is a transmitting station 84, Fig. 1, comprising a code signal transmitting distributor 85, a transmitting battery 87 and resistance 88, a home recording receiver printer whose magnets are indicated at 89, a motor 92 for driving the transmitting distributor 85, a seven lobed cam 93 fixed upon motor driven shaft 94, a cam follower 95, a pair of cam controlled contacts 96, and a manual key lever 97. Locking manual key lever 97 in its lower or normal position as illustrated holds cam follower 95 from cam 93 and holds open the contacts 98 connected to terminals of printer magnet 89. Line channel 61 extends through closed cam contacts 96, receiver magnets 89, transmitter 85, and resistance 88 to battery 87. When key lever 97 is elevated in position for testing, it closes contacts 98 to shunt the magnets 89 and releases the follower 95 to engage cam 93 and springs 96, thereby permitting cam 93 to operate follower 95 and contacts 96 to interrupt the current in line channel 61 in timed signaling manner.

Controlled by magnet 67 are armature 101, spring 102, push rod 103, and bell crank lever 104 pivoted to frame at 105 and controlling the rocking lever 18 and gate 17 to release the stop arm 19.

Operation of the preferred system illustrated in Figs. 1, 2, and 3 is as follows:

When adapted for main line or trunk service between two cities, with station 84 continuously transmitting and station 11 continuously receiving and recording, other channels being provided for transmission in reverse direction, from station 11 to station 84, the key 97 is made locking and is closed by an attendant at station 84 for a period of several minutes in routine manner, after starting the motor 92, just prior to the routine hour of beginning transmission. An operator at station 11 preparing the receiving apparatus at station 11 for beginning reception at the routine hour starts the motor 24, depresses the key 66, observes the flashing lamps 43 and 44 through the synchronizing perforations 49, thereafter holding the key 66 in operated position and adjusting motor 24 in speed until the synchronizing perforations 49 appear to be motionless, after which the key 66 is released to return to its normal position, as illustrated, and reception of code signals may begin. The attendant at station 84 must restore the locking key 97 before beginning transmission, otherwise the home recorder magnets 89 will not respond to the transmitter 85.

During the period of adjustment, the electrical operation of the system is as follows: One or the other of the condensers 69 or 75 is charged by potential of battery 71, the identity of the charged condenser being determined by the position of the armature 63. As illustrated, condenser 75 is maintained charged over the circuit including battery 71, condenser 75, resistance 76, lamp 44, and resistance 74 to ground. Upon deenergization of relay 52 and release of its armature 63 to effect engagement with its back contact 73, a discharge circuit for condenser 75 to flash the plate 81 of lamp 44 is formed including condenser 75, resistance 76, lamp plates 81 and 82, contact 73 and armature 63, while at the same time by disengagement of armature 63 from its front contact 64 a shunting condition has been discontinued from condenser 69 and a charging circuit is established for condenser 69 including battery 71, condenser 69, resistance 72, lamp 43, resistance 65, and key 66 in operated position to ground. The polar direction of the condenser charging current in the circuit just traced is such as to illuminate the plate 79 of the lamp 43 but the intensity of the current is too small to produce illumination because of the restraining effect of resistance 65. Upon reenergization of relay 52 and consequent operation of its armature 63 to disengage from its back contact 73 and to engage its front contact 64, a discharge circuit for condenser 69 to flash the plate 78 of lamp 43 is formed including condenser 69, resistance 72, lamp plates 78 and 79, front contact 64, and armature 63, while at the same time by disengagement of armature 63 from its back contact 73, a shunting condition has been discontinued from condenser 75 and the charging circuit for condenser 75 as described in the beginning of this paragraph has been reestablished, but lamp plate 82 of lamp 44 is not illuminated because the intensity of the charging current is too small due to the restraining effect of resistance 74.

At transmitting station 84, motor 92 drives shaft 94 and cam 93 continuously. There is no transmission of code signals from distributor 62 in this preliminary adjustment stage because its circuit to line is interrupted at the now open manual switch 97. Instead, continuous transmission of timing signals from station 84 is effected over a circuit extending from grounded battery 87 through resistance 88, closed contact of non-operating transmitter 85, closed contacts 98 of key 97, and to contacts 96 which now are being vibrated continuously at regulated speed by motor 92, cam 93 and cam follower 95. Thence the timing circuit extends over line channel 61 and to ground through winding of receiving line relay 52 at receiving station 11.

At receiving station 11, relay 52 operates repeatedly in response to the timing impulses, and motor 24 drives shutter 37 continuously, since depressed key 66 interrupts current to deenergize magnet 67 whose armature 101 is released and is drawn downward as viewed by its retractile spring 102, operating the push rod 103, pivoted bell crank lever 104, and rocking lever 18 to hold rocking lever 18 out of the path of gate 17 so that no restraint is offered at any time to movement of gate 17 nor therefore to rotation of cam sleeve 21 and its stop arm 19. Motor 24 therefore drives shaft 23, cam sleeve 21, gears 34, 35, shutter shaft 36 and disc 37 with perforations 49 at a regulated uniform speed suitable to establish a desired ratio between the speed of electrical timing impulses received by line relay 52 from timing cam contacts 96 and the speed of perforations successively passing a lamp 43 or 44.

Cyclic operation of armature 63 of relay 52 causes cyclic flashing of lamps 43 and 44. As illustrated in Fig. 1, cam sleeve 21 rotates once for each code signal received, shaft 36 and disc 37 rotate once for each two code signals received and cam 93 rotates once for each code signal transmitted.

In a start-stop system, cam wheel 93 at transmitting station 84 and disc 37 at receiving station 11 will be required to rotate at different speeds, and to obtain the desired optical illusion, the ratio between number of cam lobes in cam wheel 93 and number of stroboscopic perforations in disc 37 should be in a reciprocal ratio to the ratio of angular speeds, or in some multiple thereof.

As illustrated in Fig. 1, shaft 23 is regulated 14/13ths of the speed of shaft 94. Accordingly, disc 37 is provided with thirteen synchronizing perforations 49 and cam 93 is provided with seven lobes. When in accurate speed adjustment, and when running continuously for test as described above, disc 37 will cause thirteen synchronizing perforations to pass an observation point while cam 93 causes thirteen cam lobes to operate cam follower 95 and contacts 96 thirteen times to produce thirteen timed impulses in the line channel 61. In this time period, disc 37 makes one revolution and cam 93 makes 13/14ths of two revolutions. This condition of adjustment having been attained by the operator at station 11, the key 66 may be released to return to normal position, connecting the magnets 67 into operative relation with contacts of relay 52, and intelligence codes then may be received and recorded.

During transmission of intelligence code signals of start-stop nature and upon receipt of a starting signal of spacing character, relay 52 becomes deenergized, armature 63 is released and contact 73 is engaged, which permits discharge of condenser 75, producing a flash in lamp plate 81 which will not be visible opposite the graduation 46, because no slot is positioned opposite that graduation at that time. Separation of the armature 63 from contact 64 interrupts current through magnet 67 which deenergizes and which permits release of armature 101, thereby allowing rotation of sleeve 21, gears 34, 35, shaft 36, and disc 37. At the same time, the charging circuit is formed for condenser 69.

At the end of the starting impulse and upon receipt of a first or No. 1 intelligence impulse, if of marking nature, current will flow from line channel 61 through relay 52, reenergizing relay 52 and attracting its armature 63 to engage contact 64 which will restore current through magnet 67 and which also will provide the discharge circuit described for condenser 69 to flash the lamp 43. At this time disc 37 will have rotated to bring slot 55 opposite graduation 45 and the flash of lamp plate 78 will be visible at that point. At the same time the charging circuit for condenser 75 is established.

Upon receipt of a second or No. 2 intelligence impulse if of spacing nature, current will cease in line channel 61, relay 52 will become deenergized, and armature 63 will be released to engage contact 73, thereby discharging condenser 75 to flash the lamp 44, at which instant slot 56 will be opposite graduation 46, and a visible signal will be given opposite graduation 46. Thereafter throughout the code signal of line channel impulses the beginning of each impulse of marking nature will energize relay 52 to flash the lamp 43 to produce a visible signal opposite graduation 45 and the end of each marking impulse or beginning of each impulse of spacing nature will deenergize relay 52 to flash the lamp 44 to produce a visible signal opposite graduation 46. Thus marking impulses will be manifested at the top of disc 37 and spacing impulses will be manifested at the bottom of disc 37. Should the speed of the printing telegraph machine and therefore of the indicator shaft 36 and disc 37 be faster than its proper relation to the incoming individual impulses, the disc 37 will rotate through too great an angle between impulse changes so that successive visible signals will appear to be displaced successively farther to the left of a central mark in graduation 45 and to the right of a central mark in graduation 46 and the motor 24 then may be suitably readjusted in speed. It will be noted that visible signals representing the later impulses of a code signal will have a greater displacement from the middle mark of the graduation than the earlier signals of the code signal if the displacement is due to improper motor speed since the aberration will be cumulative throughout any one code signal of line channel impulses. However, should the visible signals remain fixed upon a point to right or to left of a central position on graduations 45 and 46, then adjustment of orientation may be made by handle 14, as is well known to those skilled in the art.

When adapted for printing telegraph exchange operations, the arrangement of apparatus illustrated in Fig. 1 comprises providing the simpler class of apparatus at each of the many substations and providing the more complex equipment at the central station only. In such an arrangement station 11, Fig. 1, illustrates equipment at the central office and station 84 illustrates equipment at each substation where the additions to normal equipment comprise only cam 93, follower 95, contacts 96, 98, and key 97. The process of test and adjustment is as follows: An attendant or a servicing employee visiting station 84 for inspection and being then in communication with an operator at station 11 by means of transmitters 62, 85, and receivers 67, 89, operates transmitter 85 to ask station 11 for a speed test and then operates key 97 for a period of a few seconds during which period the attendant at station 11 operates the key 66 and observes a lamp 43 or 44 through the synchronizing perforations in disc 37. Upon release of both keys 66 and 97, station 11 advises station 84 "fast" or "slow" and the attendant at station 84 adjusts the motor 92 and repeats the test until station 11 reports "O. K."

In the modification of the structure of Fig. 1 as illustrated in Figs. 4 and 5, lamps of a different type and a different system of illuminating and observing the lamps is disclosed. Shaft 111 is geared to a start-stop selector shaft as shaft 36 of Fig. 1. Disc 112 carried thereby has but a single slot. The lamp box cover 114 is graduated with fourteen graduations, in two sets, 121 to 127 and 131 to 137 inclusive. The structure is shown in Fig. 5 with its circuit and with the disc 112 removed. Lamps 141 and 142 are of annular form, and while they are distinguished by their positions, they may be further distinguished by providing gaseous lamps of contrasting colors.

Circuits for energizing one or the other of the two lamps 141 and 142 extend respectively from battery 139 through marking signal lamp 141 and marking contact 144 to armature 145 of line relay 146 to ground, and from battery 139 through spacing signal lamp 142 and spacing contact 147 to armature 145 of line relay 146 to ground. Circuit for receiving printer magnet 148 may be traced from battery through resistance 149 and magnet 148 to contact 144, armature 145 and to ground.

Operation of the structure illustrated in Figs. 4 and 5 is as follows: Line relay 146 while responding to a received signal of marking nature energizes printer magnet 148, also energizing lamp 141 in continuous illumination throughout the impulse instead of by a single flash, as was described for the lamp 43 in Fig. 1. While it is in condition of response to a spacing signal in line channel 151, the relay 146 operates its armature to deenergize lamp 141 and printer magnet 148 and to energize lamp 142 continuously instead. Normally a current of marking nature flows in line channel 151, relay 146 holds its upper contact 144 closed and maintains in energized condition magnet 148 and marking signal lamp 141. A steady glow is seen through the slot of disk 112, now motionless. Upon receipt of a starting impulse of spacing nature, relay 146 reverses its armature, disengaging its upper contact 144 to deenergize magnet 148 and lamp 141 and engaging its lower contact 147 to energize lamp 142. The disc 112 starts responsively to deenergization of magnet 148, and by reason of continuous illumination of lamp 142, it produces the optical effect of an arcuate band of light from the radius of graduation 121 to the radius of graduation 122, at which point receipt of a first intelligence impulse of marking nature in line channel 151 will reverse the armature of relay 146 to disengage its lower contact 147 and to engage its upper contact 144, thus deenergizing lamp 142 and energizing lamp 141 so that in the continuance of rotation of disc 112 there will be produced the illusion of an arc of light from the radius of graduation mark 122 to the radius of graduation mark 123 and so on throughout the complete cycle of a code signal concurrent with a one-half rotation of disc 112. A subsequent received code signal will be manifested similarly in relation to graduations 131 to 137. Each impulse will be manifested in the form of an arc of light extending between two graduation marks and the points of change of radius and color with perfect adjustment of speed and orientation will be at all times opposite the major graduation marks. Any variation from this normal manifestation may be adjusted by varying the speed of the motor and by the use of the orientation handle 14, as described above for the structure of Fig. 1.

Referring to Figs. 6 and 7, a modified structure is illustrated in which an orientation indicating device utilizing lamps of another type and another system of observing the lamps is associated with a start-stop regenerative receiver or repeater. In Fig. 6 is illustrated a translucent graduated scale 161, a rotatable shutter shaft 162 with slotted disc 163 and a light cabinet cover 164. In Fig. 7 the light cabinet cover 164 is illustrated with graduated scale and rotatable disc removed to reveal two shutters 166, 167, whose operating mechanism also is shown. Shaft 162 and supporting screws 160 are shown in section. Shutter 167 with spring 165 is pivoted upon fixed pivot 168 and is operable by magnet 169 whose winding is included in circuit of line channel 171 in series with the winding of receiving magnet 172. Shutter 166 is integral with a contact controlling member 175 which in common with armature 176 of magnet 172 is pivoted upon a fixed pivot 177. Member 175 is urged by compression springs 178 and 179 alternately and restrained by lever 181 pivoted at 182 and controlled by lobes 183 on a multi-lobed cam 184. Signal receiving magnet 172 has armature 176 pivoted at 177 which engages both springs 178 and 179 and places one or the other under compression to urge member 175 against lever 181 either by magnetic attraction to compress the spring 179 or by power of retractile spring 185 to compress the spring 178 in absence of magnetic attraction. Magnet 172 upon its deenergization and release of armature 176 also operates push rod 186, bell crank lever 187, rocking lever 188, gate 189, and stop arm 191 to control starting of cam sleeve 192.

Light cabinet cover 164 obscures two continuously glowing electric lamps 194 and 195 and has two fixed windows 196 and 197. Shutter 166 has two windows 198 and 199 so located that when shutter 166 is in its lower position as shown, its window 198 coincides with fixed window 196 while fixed window 197 is obscured, and alternatively when shutter 166 is in its upper position, its window 199 coincides with fixed window 197 while fixed window 196 is obscured. Shutter 167 has two windows 202 and 203 which coincide with fixed windows 196 and 197 only when in transit and accordingly shutter 167 in either position of rest obscures both fixed windows 196 and 197. With member 175 up and shutter 166 down as shown, a transit of shutter 167 will permit a flash of light through fixed window 196 while with member 175 down and shutter 166 up, a transit of shutter 167 will permit a flash of light through fixed window 197. In either instance the beam of the flash impinges upon the back of the rotatable disc 163 and a pencil of light may pass through any slot 206 to 216 inclusive to show a spot of light upon and through the translucent dial 161 where it forms an indication upon graduation 221 or 222.

Fig. 6 illustrates the translucent graduated scale 161, the rotatable disc 163 and the relations between and among the graduations, the disc and the fixed windows. Disc 163 is shown in its stopped condition and its ten radial slots 206 to 216 inclusive are shown in their starting positions. Dotted rectangles 225 and 226 in Fig. 6 do not represent apparatus at rest but illustrate transient critical positions of the slots 206 to 216 inclusive when disc 163 is rotating. Shaft 162 and disc 163 are geared to cam sleeve 192 as suggested in Fig. 1 for corresponding structural elements 36, 37, and 21 respectively, and the disc 163 rotates through but 180° in response to each complete code signal, whereby slots 206 to 211 inclusive serve alternating received code signals and alternating code signals are served similarly by the companion set of slots 212 to 216 respectively.

Member 175 carries an electrical contact spring 228 which engages a fixed contact 229 to connect battery 234 to conductor 233 in accordance with received signals. Conductor 233 may lead to a local receiving printer magnet or may connect over an outgoing line to a receiver 234 at a remote location if the mechanism of Fig. 7 is located at a repeating station. Magnets 169 and 172 are connected to a line channel 171 which extends to a controlling transmitter 235 at a remote location.

Operation of the modification shown in Figs. 6 and 7 is as follows: Normal condition of this operating system when not transmitting signals provides closed circuits for line channel 171 and conductor 233, with magnets 169 and 172 energized, with member 175 locked in its upper position by lever 181, with cam sleeve 192, cam 184, and shutter 163 stopped by gate 189, with shutter 166 down, and with shuter 167 up and sustained in its upper position by line channel signal current through magnet 169. Motors are running at regulated speeds after having been started by any desired system of motor control and transmission is by start-stop code method of signaling.

Receipt of a starting signal of spacing nature under control of transmitter 235 deenergizes magnets 169 and 172. Deenergized magnet 169 releases shutter 166 which is drawn by its spring 165 into its lower position, causing window 202 in transit to permit a flash beam from lamp 195 through window 196 upon the back of disc 163 which is at rest in its position shown in Fig. 6 with no slot opposite the window 196, hence no light reaches graduated scale 161. Deenergized magnet 172 releases its armature 176 concurrently with release of shutter 166 and armature 176 is drawn by its spring 185 to operate push rod 186, bell crank lever 187, and rocking lever 188 to release gate 189, arm 191, sleeve 192 and cam 184 and to compress spring 178, thus urging downwardly the member 175 which at the instant is mechanically locked by lever 181. After a predetermined angle of rotation of cam 184, a cam lobe 183 engages and operates lever 181 in a manner to unlock member 175, thus permitting spring 178 to operate member 175 and shutter 166 into their alternative position from that shown, where they are locked by lever 181 upon its return to normal position after passage of lobe 183 under lever 181. Movement of shutter 166 does not produce a signal upon translucent scale 161 as both of the fixed windows 196 and 197 are obscured by shutter 167 at the time of movement of shutter 166. The structure illustrated in Fig. 7 now is in readiness for receipt of a line signal impulse of marking nature with window 199 in alignment with fixed window 197.

Receipt of a subsequent signal impulse of marking nature reenergizes magnets 169 and 172. Reenergized magnet 169 attracts its armature and moves shutter 167 into its upper position, causing window 203 in transit to permit a beam flash from lamp 194 through fixed window 197 upon the back of disc 163 and a pencil flash of light through a disc slot to impinge upon the back of translucent graduated dial 161, thereby producing a point of light upon dial 161 adjacent to the graduation 222. All light signals upon dial 161 in response to beginning of reception of a signal impulse of marking nature will occur near graduation 222. Should the No. 1 impulse of a start-stop character code signal be of marking nature following a starting signal impulse of spacing nature, slot 206 will be in transit passing graduation 222 at the instant when shutter 167 responds to the beginning of the marking signal with shutter 166 in its upper position as determined in response to the starting impulse, and a flash pencil of light will be seen upon graduation 222. Should the No. 2 impulse of a start-stop character code signal be of marking nature following a starting signal impulse and an associated No. 1 impulse of spacing nature, slot 207 will be in transit passing graduation 222 at the instant when shutter 167 responds to the beginning of the marking signal, and similarly for any first or subsequent signal impulse of marking nature following a signal impulse of spacing nature, the flash pencil of light upon translucent dial 161 being in every such instance adjacent to graduation 222. Reenergized magnet 172 attracts its armature concurrently with operation of shutter 167 just described and armature 176 is attracted to effect a compression of spring 179, thus urging upwardly the member 175 at that instant locked by lever 181. A cam lobe 183 then engages and operates lever 181 in a manner to unlock the member 175 and to permit spring 179 to operate member 175 and shutter 166 into their positions shown. No light reaches dial 161 since shutter 167 instantly at rest obscures both fixed windows 196 and 197.

All light signals upon dial 161 in response to beginning of reception of a character code signal impulse of spacing nature following a signal impulse of marking nature and other than a starting impulse will impinge upon dial 161 contiguous to graduation 221. Should a No. 1 signal be of spacing nature there would be no change in nature of line channel signal between start signal impulse and No. 1 signal impulse, and accordingly no action in the orientation indicator would result. At the instant of beginning of a No. 1 impulse time interval, slot 206 would be passing the signal position 225 Should a No. 1 impulse be of marking nature, a flash signal would be given through slot 206 to dial 161 at graduation 222 as described above, and the structure illustrated in Figs. 6 and 7 would thereafter remain in condition to respond to a change of signal from a No. 1 signal of marking nature to a No. 2 signal of spacing nature which is the earliest signal of spacing nature following a signal marking nature which can be received in a start-stop system. Should the No. 2 signal impulse be of spacing nature following a No. 1 signal impulse of marking nature, slot 206 will be in transit passing graduation 221 at the instant when shutter 167 responds to the beginning of the No. 2 signal impulse of spacing nature with shutter 166 in its lower position as positioned in response to the preceding starting and No. 1 signal impulses of marking nature, and a flash pencil of light will be seen upon graduation 221. Similarly for a No. 3 impulse of spacing nature following a No. 2 impulse of marking nature, slot 207 will be passing graduation 221 to produce a flash pencil of light upon graduation 221 and similarly when a similar succession is presented in later contiguous signal impulses.

Observation of the light signals produced upon dial 161 may be interpreted as suggested in the description of the structure of Figs. 1, 2, and 3 herein.

Figure 8:
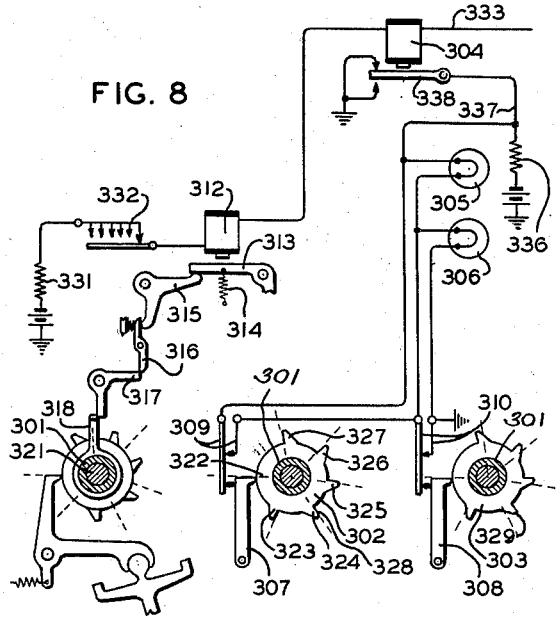
Fig. 8 illustrates a system of cam follower contacts for controlling flashing of lamps to indicate a predetermined degree of maladjustment.

In Fig. 8 is illustrated an orientation indicator in which two indicating lamps normally are equally illuminated by impulses of current during transmission and in which one of the two lamps is extinguished when the receiving recorder ceases to be in phase with the received telegraphic code signals.

The mechanical structure of the receiving and recording printer is identical with the mechanism disclosed in Patent 1,783,382 to Krum, to the start-stop cam drum 301 of which are added two cams 302 and 303. A phase indicating relay 304 is included in the line circuit and two orientation indicating lamps 305 and 306 are suitably mounted for observation. Cams 302 and 303 are provided with cam followers 307, 308 and with cam controlled contacts 309, 310 respectively. Signal receiving magnet 312 is provided with an armature 313 and with armature spring 314 which when released rock pivoted bell crank 315 and pivoted rocking lever 316 to release a gate latch 317 which releases stop arm 318 on cam drum 301, thus permitting the drum 301 to be driven by power shaft 321 by means of a friction clutch as shown in the Krum patent cited, thereby setting into motion the orientation indication controlling cams 302 and 303.

Referring to cam 302, the cam is shown in its normal stop position with a zero radius line 322 at the effective point of the cam follower 307. Cam lobes 323 to 327 inclusive are spaced 55 5/13 degrees or 2/13 of a circumference from each other and from the zero radius line 322 as measured from their radial faces 328. The lift and the dwell of the lobes are arbitrary in dimension, since only that arc of the dwell which is contiguous to the radial face of the lobe is effective in producing a signal in the lamps 305, 306. Cam 203 is similar to cam 302 in shape but its angular position upon the cam barrel 301 is such that the angles of 2/13 circumference are measured from its zero radius to the shoulder point 329 at the meeting of the lift face and the dwell face instead of to the radial face. A line circuit for received telegraphic signals extends from grounded battery through resistance 331, transmitter 332, winding of signal receiving magnet 312, and winding of orientation indicator relay 304 to line conductor 333 upon which telegraphic signals are produced by opening and closing a connection to ground at a remote point on the line. A lamp circuit extends from grounded battery through resistance 336, through lamps 305 and 306 to ground, with a branching conductor 337 through armature 338 and its contacts to ground, with branching conductors from the two terminals of lamp 305 to cam controlled contacts 309, and with branching conductors from the two terminals of lamp 306 to cam controlled contacts 310.

The operation of the system illustrated in Fig. 8 is as follows: In intervals between code signals, current flows in the circuit of line 333 and also in the lamp circuit through resistance 336 to ground at contacts of armature 338 and through contacts 309 and 310 to ground. With proper adjustment of all parts, a start signal impulse of spacing nature deenergizes magnet 312 and relay 304. Movement of the armature of relay 304 while in transit interrupts the current in the conductor 237 but no effect upon the lamps 305 and 306 is produced because of the shunting contacts 309 and 310. Magnet 312 releases its armature 313 and spring 314 operates the armature 313, the bell crank 315, and the rocking lever 316, permitting operation of gate latch 317, stop arm 318, and cam drum 301, setting cams 302 and 303 in motion. The angles of the cam lobes of cams 302 and 303 are directly related to the timing of the received signals in the line 333. The No. 1 line signal will begin in relay 304, and if of marking nature will operate the armature 338, just as the radial face of lobe 323 on cam 302 and the shoulder 329 on cam 303 are passing simultaneously under their respective cam followers 307 and 308. With ideal adjustment, contacts 309 first will be disengaged, then armature 338 will disengage from its back contact, and current will flow through unshunted lamp 305, and then lobe 323 will pass its follower 307, permitting the follower to fall to reclose its contacts 309, terminating the current of lamp 305, and the first lobe of cam 303 will lift its follower 308 to open the contacts 310 and current will flow through lamp 306, after which armature 338 finally will engage its front grounded contact to shunt the lamp 306, terminating the current in lamp 306. Each lamp will have had a momentary current, and the illumination of the two lamps will be approximately equal. Should the received signal arrive earlier than the ideal instant, or in other words, should the cams be later with reference to the timing of the received signal impulses, the armature 338 will have closed its front contact before leading cam 302 had closed its contacts 309 and before the lagging cam 303 had opened its contacts, and the lamp 305 would have received all of the current permitted by armature 338 and the lamp 306 none. Conversely, should the received signal arrive later or cams 302, 303 earlier than the ideal instant, the armature 338 would not have opened its front contact before the leading cam 302 had closed its contact 309, and armature 338 would open its back contact after the opening of the cam contact 310, thereby assigning no current to the lamp 305 and all current to the lamp 306. Thus it will be seen that a leading signal impulse will cause an increased illumination of the lamp 305 and a decreased illumination of the lamp 306, while a lagging signal impulse will cause an increased illumination of the lamp 306 and a decreased illumination of the lamp 305. Upon receipt of a signal of spacing nature following a signal of marking nature, the action is similar but with the armature of relay 304 operating in a reverse direction. There is no lamp flash at the beginning of the starting signal nor at the beginning of the stop signal because lobes are not provided in those positions on cams 302 and 303.

Fig. 9 illustrates a modification of the structure of Fig. 8, in which phase relay 304 of Fig. 8 is retained as relay 340 in the circuit of line conductor 341, in which lamps 305 and 306 are replaced by a signal lamp 342, in which cams 302 and 303 are replaced by a single cam 343 so located angularly upon the cam drum 345 that the dwell of each lobe 344 has its middle point positioned when at rest $2/_{13}$ of a circumference from the zero radius line 346, which it at the point of operation of the cam follower 247, and in which cam contacts 348 are normally disengaged from each other and are designed to be operated into engagement with each other by the cam follower 347. The lamp circuit extends from grounded battery through resistance 351, conductor 352, and lamp 342 to ground, with a branch conductor 353 from resistance 351 through armature 354 and contacts to ground, and with branching conductors 355 from the terminals of the lamp 342 to the cam controlled contacts 348. The operation of the modification illustrated in Fig. 9 is as follows: Upon receipt of a starting signal of spacing nature, relay 340 is deenergized, armature 353 is released and operates from its front contact to its back contact, removing while in transit the ground connection from conductor 353 and momentarily removing the shunt from lamp 342 thereby flashing the lamp, and simultaneously through the operation of starting mechanism as illustrated in Fig. 8, the cam barrel 345 and cam 343 are started. At the moment of receipt of each impulse of the ensuing code signal, wherein the nature of the signal impulse changes from spacing to marking or from marking to spacing, the relay 340 will operate its armature to interrupt the current in shunt conductor 353, but with the ideal adjustment of parts, cam lobe 344 will have operated the cam follower 347 to close and hold closed the contacts 348, shunting the lamp 342 so that a flash of the lamp does not occur. Should the received signal impulse cause operation of the armature 354 before the cam 343 has operated the contacts 348, the shunt of branching conductor 353 will have been removed before the shunt of branching conductors 355 will have been applied, and a flash of the lamp 342 will result, thus producing an "out of phase" visual signal. Similarly, should the received signal arrive late, the shunt of branching conductors 355 will have been reopened by cam 343 and cam contacts 348 before armature 354 has reestablished the ground connection upon branching conductor 353, resulting in a flash of lamp 342. There is no difference between the lamp signals for fast and slow phasing.

Figure 10:
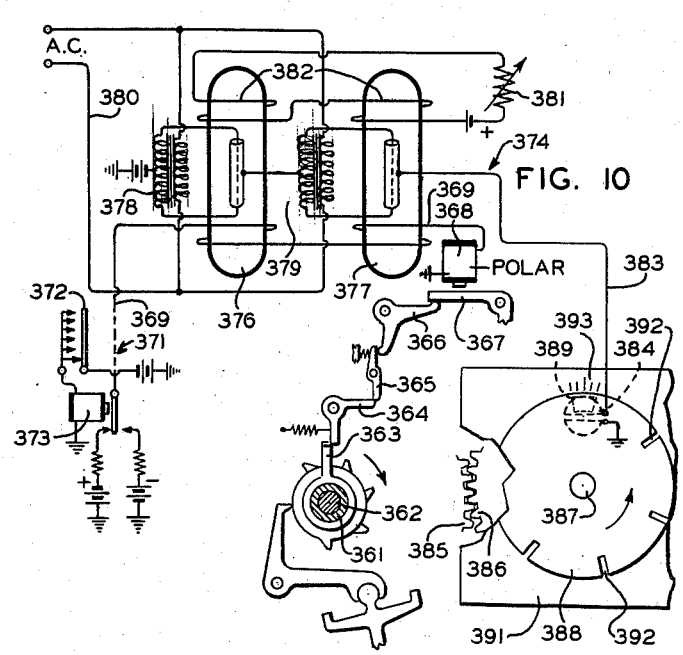
Fig. 10 illustrates a system of magnetron relays for controlling flashing of a lamp.

In Fig. 10 the structure of the Krum patent cited is reproduced, in cam drum 361 driven by power shaft 362, stop arm 363, gate latch 364, rocking lever 365, bell crank 366, and armature 367 controlled by polar magnet 368 whose winding is included in the circuit of line conductor 369. A pair of magnetron tubes 376 and 377 are provided in series with the signal receiving magnet. A remote controlling station 371 is equipped with permutation code signal transmitter 372, transmitting relay 373, and a grounded source of positive and negative current, and is connected over a line channel 369 to the receiving station 374 where the line circuit extends through the controlling windings of the pair of magnetron valves 376 and 377 and through the polar signal receiving magnet 368 of the Krum telegraphic recorder to ground. Filaments of the magnetron valves are connected to windings 378 and 379 in inductive fields energized over a circuit 380 including a source of alternating current. A source of direct current and an adjustable rheostat 381 are connected to polarizing windings 382 in the magnetrons 376, 377. A circuit controlled by the two magnetrons extends from battery through windings 378 to the heated electrode of magnetron 376, thence from the cold electrode of magnetron 376 to the heated electrode of magnetron 377 thence from the cold electrode of magnetron 377 over conductor 383 and through lamp 384 to ground. A gear wheel 385 is fixed to the cam drum 361 and meshes a similar gear wheel 386 which is attached to a shaft 387 which bears also a rotary shutter 388 mounted to obscure a window 389 in the wall of the lamp box 391 which contains the lamp 384. The disc 388 is provided with slots 392 which may pass over the window 389 to render the lamp 384 visible and scale marking 393 is provided upon the box wall adjacent to the position of the slots when passing the window 389.

Operation of the structure illustrated in Fig. 10 is as follows: Biasing current in the polarizing windings 382 is adjusted by rheostat 381 to permit current to flow through the electrodes of the magnetron valves to cause illumination of lamp 384 when no current is flowing in line channel 369, but the biasing current is sufficient when supplemented by line current in either polar sense to estop any flow of current through the electrodes. With polarity of the biasing battery through winding 383 as indicated by positive sign, current through the line channel 369 from positive battery at station 371 will supplement the current in winding 382 of magnetron valve 376 and prevent current from flowing through the electrodes of magnetrons 376 and at other times current through line channel 369 from negative battery at station 371 will supplement the current in winding 382 of magnetron 377 and prevent current from flowing through the electrodes of magnetron 377. Thus with the magnetrons 376 and 377 controlled by continuous operation of the armature of relay 373, the only time periods in which the line windings of magnetrons 376 and 377 will have no current will be during the transit time of the armature of relay 373 and during the increment of time produced by the capacity of the line channel 369. At the change of each signal impulse therefore, an impulse of current will flow through the lamp circuit described above and will flash the lamp 384. The flash of the lamp 384 in response to the beginning of the starting impulse of a start-stop code signal will not be visible because there is no slot 392 positioned in the shutter 388 in front of the lamp 384 when the shutter 388 is in its stop position as shown. The starting impulse however will start the shutter into rotation and thereafter with proper adjustment of parts and speeds, one of the slots 392 will be opposite the long mark of the graduations 393 at the instant of the change of the line signal and therefore at the instant of the flash of the lamp 384. A stroboscopic disc 388 therefore will produce an illusion of a stationary illuminated slot. Signals which arrive earlier than desired will show a displacement to the left as viewed in the drawings, and signals which arrive later than desired will show a displacement to the right as viewed in the drawings.

Figure 11:
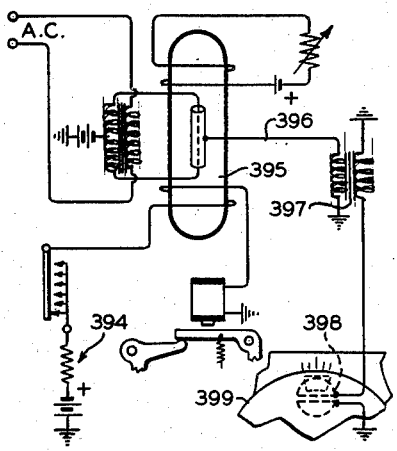
Fig. 11 illustrates a modification of the system shown in Fig. 10 with but a single magnetron relay.

Fig. 11 illustrates a modification of the structure of Fig. 10, the transmission from the remote station 394 being by a single battery with interruptions of current. A single magnetron valve 395 operates as magnetron 376 in Fig. 10 to prevent current in conductor 396 when current is flowing in the line, and operating to permit current to flow in conductor 396 and in induction coil 397 when no line current is flowing. At the beginning of current in induction coil 397, an impulse of induced current is delivered to a lamp 398, thereby flashing the lamp. A slotted shutter 399 similar to the shutter 388 of Fig. 10 is provided and the flashes are observed and interpreted as described in connection with the description of Fig. 10.

Figure 12:
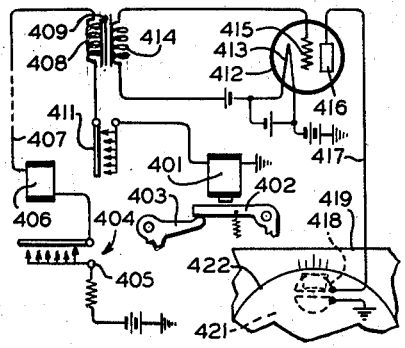
Fig. 12 illustrates a system utilizing a thermionic valve for controlling flashing of a signal lamp.

Fig. 12 illustrates a further modification of the invention. A single receiving magnet 401 controls an armature 402 and bell crank 403 which indicates in Fig. 12 all of the shutter starting and shutter driving members shown in Fig. 10. A line signaling circuit extends from battery at station 404 through permutation transmitter 405, signal receiving magnet 406, line transmission channel 407, winding 408 of induction coil 409, permutation transmitter 411, and signal receiving magnet 401 to ground. A thermionic valve 412 has a grid circuit extending from filament 413 through winding 414 of induction coil 409 to grid 415 and has a plate circuit extending from grounded battery through filament 413, plate 416, conductor 417, and lamp 418 to ground, the lamp 418 being mounted in lamp box 419 near window 421 and slotted shutter 422.

The operation of the structure of Fig. 12 is as follows: At the beginning of each signal of marking nature in the line signal circuit 407 the change in magnetization of induction coil 409 produces in winding 414 an induced electrical impulse of proper polarity to influence the grid 415 to permit an impulse of current in the plate circuit over conductor 417 to cause a flash of the lamp 418. These flashes are observed and interpreted as described in the description of operation of the structure illustrated in Fig. 10

Fig. 13 illustrates an amplification of the system of Fig. 12 in which the number of flashes is increased by producing a flash in the phasing lamp at each change of signal whether from marking to spacing or from spacing to marking. Two thermionic valves 426 and 427 are provided whose grids 428 and 429 are connected to two induction coil windings 430 and 431 and whose plate circuits 432 and 433 are connected to a common lamp wire 434 and through lamp 435 to ground. A line transmission circuit extends from station 436 over line channel 437 through induction coil winding 438 as in Fig. 12. In operation at each change of signaling conditions in winding 438, an impulse of induced current will be produced in each of windings 430 and 431, a change in the signal from marking nature to spacing nature producing an electrical impulse in winding 430 to cause grid 428 to permit an impulse of current in plate circuit 432 through lamp 435 to ground to flash the lamp 435, and a change in signal from spacing nature to marking nature producing an electrical impulse in winding 431 to cause grid 429 to permit an impulse of current in plate circuit 433 through lamp 435 to ground to flash the lamp 435. There is no distinction between the two classes of signals.

Fig. 14 illustrates a further modification of the structure of Fig. 10, a line relay being provided with contacts and circuits for operating the phasing lamp. Signal receiving relay 440 controls signal receiving magnet 441 with an armature 442 and bell crank 443 which indicates in Fig. 14 all of the shutter starting and shutter driving members shown in Fig. 10. A line signaling circuit extends from battery at station 444 through permutation transmitter 445, signal receiving magnet 446 and line transmission channel 447, winding of line signal receiving relay 440, and permutation transmitter 448 to ground. A lamp circuit extends from battery through resistance 451, resistance 452, conductor 453, and lamp 454 to ground with a branching conductor 455 from resistance 451 through winding of magnet 441 and front contact of armature 456 to ground, and with a branching conductor 457 from conductor 453 through back contact of armature 456 to ground. Lamp 454 is mounted in a lamp box 458 near window 459 and rotating slotted shutter 460. In operation, lamp 454 is shunted by armature 456 either through conductor 455 and front contact or through conductor 457 and back contact, except during the transit times of the armature 456 both branching conductors are open at the two contacts of the armature and current flows through the lamp 454, a flash being thus produced at every change of signal current in the winding of the relay 440 whether the change be from current of marking nature to current of spacing nature or from current of spacing nature to current of marking nature. The flashes of the lamp 454 are observed and interpreted as described in connection with the description of operation of the structure of Fig. 10.

Fig. 15 illustrates a modification of the invention having a rotary stroboscopic shutter and having two phase-indicating lamps whose illuminating currents are controlled by a thermionic valve and a set of cam controlled contacts jointly. In Fig. 15 is illustrated an indcator in which two indicating lamps normally are equally illuminated and in which one of the lamps is extinguished and the other lamp increased in illumination when a receiving recorder ceases to be in phase with the received telegraphic code signals. A shutter having two sets of slots is provided to facilitate observation of the two indicating lamps independently of each other. The mechanism is shown partly in exploded sections to reveal details of the contact-controlling cams.

The mechanical structure of the receiving and recording printer of Fig. 15 is identical with the mechanism of the Krum patent cited with addition of the following apparatus. To the cam drum 476 are added two cams 477, 478 and a gear wheel 479. Associated with the cams 477, 478 are cam followers 481, 482 and controlled cam contacts 483, 484. Associated with the gear wheel 479 and driven thereby is a gear wheel 485 having a diameter double that of gear wheel 479 carried by shaft 486 which carries also a stroboscopic shutter 487 with slots 490 which by the described gear wheels is driven at one-half the angular speed of the start-stop cam drum 476. The shutter 487 covers a circular opening 488 in the side of a lamp box 489 which contains two lamps 491, 492 positioned near the opening 488 and shutter 487. On the lamp box near the edge of the disc are graduations 493, 494. Operating circuits are as follows: A line circuit extends from grounded battery at station 501 through resistance 502, permutation transmitter 503, signal receiving printer relay 504, line channel 505, winding 506 of induction coil 507, permutation transmitter 508, and signal receiving printer magnet 509; a grid circuit for thermionic valve 510 extends from filament 511 through winding 512 of induction coil 507 to grid 513; a plate circuit or lamp circuit extends from grounded battery through filament 511, plate 515, conductor 516, lamp 491 and lamp 492 to ground, with branching conductors 517, 518 from conductor 516 and from terminal of lamp 491 respectively to cam controlled contacts 483 and a further branching conductor 520 from conductor 518, through cam controlled contacts 484 to ground. Signal receiving relay 509 has armature 521 with spring 522 which when released rocks bell crank 523 and rocking lever 524 to release a gate latch 525 which releases stop arm 526 on cam drum 476, thus permitting the cam drum 476 to be driven by power shaft 527 by means of a friction clutch as shown in the Krum patent, thereby setting in motion the orientation cams 477, 478 and gears 479, 485.

Referring to cam 477, the cam is shown in normal stop position with a zero radius line 531 at the effective point of the cam follower 481. Cam lobes 532 are spaced 2/13 of a circumference from each other and from the zero radius line 531 as measured from their radial faces 533. Cam 478 is similar to cam 477 in shape but its angular position upon the cam barrel 476 is such that the angles of 2/13 circumference are measured from its zero radius to the shoulder point 535 at the meeting of the lift face and the dwell face instead of being measured to the radial face.

In operation, start-stop permutation code signals are originated at transmitter 503 and are transmitted through line channel 505 and induction coil 507 to be effective upon the receiving and recording magnet 509. At the beginning of each signal of marking nature through the induction coil 507, the change in magnetism in the induction coil produces in winding 512 an induced electrical impulse of proper polarity to influence the grid 513 to permit an impulse of current in the plate circuit to cause a flash of an unshunted lamp 491 or 492. With all apparatus and speeds properly adjusted, cam 477 first will open its contacts 483 thus opening the shunt of branching conductors 517 and 518 around lamp 491, then a momentary current will begin in the plate circuit and will be effective upon unshunted lamp 491, then cams 477 and 478 operate simultaneously to close contacts 483 and to open contacts 484, closing the shunt of branching conductors 517 and 518 around lamp 491 and opening the shunt of branching conductor 520 around lamp 492 and causing the current in the plate circuit to be effective upon the lamp 492 after which the current in the plate circuit stops.

The two lamps 491 and 492 thus flashing with the slots 490 accurately positioned opposite the long mark of the graduations 493 and 494 will produce an illusion of motionless radial lines of light opposite the graduations. Should the start-stop cams 477 and 478 be adjusted with proper speed but advanced in orientation so that the cam 477 opens and closes its contacts 483 before a received signal impulse of line 505 is repeated through valve 510, then upper lamp 491 will receive no current and will not be illuminated while the lower lamp 492 will increase in illumination and a slot-controlled line of light produced thereby will be displaced counterclockwise in position. Should the speed be proper but should the orientation adjustment be such that the thermionic valve 510 completes transmission of the signal before the cam 478 opens its contacts, then lower lamp 492 will receive no current and will not be illuminated, while upper lamp 491 will increase in illumination and the slot-controlled line of light produced thereby will be displaced counterclockwise.

Should the adjustment of orientation be accurate and should the speed adjustment be such as to cause cams 477 and 478 to rotate too rapidly, the two radial lines of light produced by the lamps and the shutter for each received code signal will appear opposite the long graduation marks, the lower radial line of light will move clockwise and vanish, while the upper radial line of light will move clockwise and increase in illumination. Should the adjustment of orientation be accurate and should the speed adjustment be such as to cause cams 477 and 478 to rotate too slowly, then the upper radial line of light will move counterclockwise and vanish while the lower line of light will move counterclockwise and increase in illumination.

In Figs. 16 and 17 there is illustrated a wholly mechanical embodiment of the invention. There is provided a rotary shutter 541 upon which are shown a radial line 542 indicating a point of observation and radial lines 544 indicating radii displaced from radius 542 by angles of 2/13 circumference. The gears 560 are equal ratio and direction of rotation is indicated by arrows. In advance of five radial lines 544 and uniformly distant from the axis of the shutter are five observation windows 545 each of which is filled with a transparent colored material. Following the five radial lines 544 and at a greater distance than the distance of windows 545 from the axis of the shutter are five observation windows 546 which are filled with a transparent material of contrasting color. The drawing is hatched to indicate red and green for these windows. Line signal magnet 547, whose winding is included in line circuit 548, has armature 549 pivoted at 551, and attached to the armature or to the pivot shaft is an oscillating shutter 552 having an observation slot 553 whose position, when armature 549 is at its attracted angle, is indicated in solid line at 553, and whose position when armature 549 is at its released angle, is indicated by the dot-dash slot position 554. A fixed shutter 556 has a slot 557 of shape similar to 553 and located in a mean position between the two positions 553 and 554, the arrangement being such that shutter 552 obscures slot 557 when armature 549 is in its attracted angle or in its released angle, but slot 553 passes slot 557 and opens a path for a beam of light during the transit time of armature 549.

In Fig. 17 is shown an optical system for the structure of Fig. 16 which includes a lamp 561, condensers 562, collimator 563, and dispersion lens 564 in addition to oscillating shutter 552, fixed shutter 556 and rotating shutter 541.

Operation of the system of Figs. 16 and 17 is as follows: Current of marking nature normally flows in line 548, energizing magnet 547, and holding in position shown all of the parts so that the path of the light beam is obscured by a solid portion of the stopped shutter 541. Upon receipt of a starting signal impulse of spacing nature, magnet 547 becomes deenergized and releases its armature 549, whose spring operates the sundry mechanical parts as described in connection with Fig. 10 and releases the rotating shutter 541 to start. After a time interval corresponding to 2/13 rotation of shutter 541, the first No. 1 impulse of the code signal is received and if of marking nature, the magnet 547 will become energized, its armature 549 will be attracted, oscillating shutter 552 will pass its slot 553 through alignment with fixed slot 557, thus aligning the two slots in preparation of a path for the light beam from continuously glowing lamp 561. With all parts in accurate adjustment, the first radius line 544 will be in alignment with fixed slot 557 and the path prepared by slots 553 and 557 will be obscured by the opaque body of rotating shutter 541. However, should adjustments be such that the shutter 541 at the first or any later radius 544 of the shutter 541 be retarded so that the alignment of slots 553 and 557 may occur while window 545 is passing fixed slot 557, then a path will be formed for light from lamp 561 through red window 545 into observation lens 564. On the contrary should adjustments be such that any radius 544 passes the fixed slot 557 in advance of the ideal instant so that the slots 553 and 557 align while green window 546 is passing the fixed slot 557, then a path will be formed for a beam of light from lamp 561 through green window 546 into observation lens 564. Thus it will be seen that with the shutter 541 and its associated recording printer running with improper orientation or running too fast, the observation lens 564 will show a practically continuous green illumination or if too slow then a red illumination.

In Fig. 18 is illustrated an adaptation of the present invention to the apparatus of a multiplex telegraph system. A multiplex commutator has a fixed distributing head 571 with a brush arm 572 driven by a regulated shaft 573. Upon the shaft 573 is fixed to rotate with the shaft a slotted shutter 574. A flashing lamp 575 is controlled to flash in any desired manner under control of received line signals as for example according to the system illustrated in Fig. 10, Fig. 12, or Fig. 13. Adjacent to the rotating shutter 574 is an arcuate scale 576 provided with arcuate slots 577 spanning two fixed guide studs 582 and having clamp screws 578 and provided also with graduations 579. In operation, the lamp 575 may flash for every change of signal, as in Figs. 10 and 13, or for each change in one sense only as illustrated in Fig. 12. Since the signals are changing at the speed at which the slots 581 are passing the lamp 575, an illusion of a fixed slot will be attained which will vary its position when and if the speed of the rotating shutter 574 varies. The arcuate scale 576 may be adjusted manually to bring its long graduation opposite the radial point at which the flash of lamp 575 should appear and there may be clamped by the screws 578, any variation in speed and the degree of variation thereafter being observable by comparison with the shorter marks of the graduation.

In disclosing this invention herein its fundamental principles and a very considerable number of modifications have been illustrated. It is obvious that when this invention is applied to machines or structures other than the structure of the machine illustrated in the Krum patent cited above, the mechanical structure of the apparatus of the invention must be modified to cooperate with the mechanical structure of the receiving and recording telegraph instrument whose condition of orientation it is required to manifest. The appended claims therefore are intended to cover not only the structures of the illustrations herein presented but all modified structures embodying the spirit of the invention.

What is claimed is:

1. In a start-stop code-signal system, an operating magnet, a rotary selector member controlled by said magnet to start in response to one impulse in a received code signal, a slotted shutter driven by said rotary member, a lamp cooperating with said slotted shutter and producing pencils of light through slots of said shutter, a signaling circuit including a relay responsive to a plurality of impulses in a code-signal, and an operating circuit including said magnet and said lamp and controlled by contacts of said relay to shunt said lamp in response to a plurality of impulses in a code signal and operating to unshunt said lamp to produce transit time illuminations of said lamp in variant positions of said shutter.

2. In an orientation indicating device, a signal responsive relay, a signal responsive magnet, a stroboscopic shutter responsive to operation of said magnet, a lamp adjacent to said shutter, and means to energize said lamp responsively to transit lines of operation of said relay.

3. In an orientation indicating device, a signal responsive line relay, a telegraphic recorder magnet responsive to contacts in said line relay, a stroboscopic device responsive to movement of the armature of said magnet, a lamp adjacent to said stroboscopic device, an energizing circuit for said lamp comprising a battery, series resistances and said lamp, and two branching conductors from said lamp circuit to front and back contacts respectively of said line relay and forming closed shunts for said lamp when the armature of said relay is in attracted or retracted position but not when said armature is in transit, said magnet included in one of said branching conductors.

4. In an orientation indicating device, a signal responsive line relay, a magnet responsive to contacts of said line relay, a stroboscopic device responsive to movement of the armature of said magnet, a lamp adjacent to said stroboscopic device, an energizing circuit for said lamp comprising a battery, series resistances and said lamp, and two branch conductors from said lamp circuit to front and back contacts respectively of said line relay and forming closed shunts for said lamp when the armature of said relay is in attracted or retracted position but not when said armature is in transit.

LOUIS M. POTTS.